US012254754B2

(12) United States Patent
Müller et al.

(10) Patent No.: US 12,254,754 B2
(45) Date of Patent: Mar. 18, 2025

(54) SECURITY SYSTEM, METHOD OF EMITTING AN ALARM SIGNAL, BUS, USE OF A SECURITY SYSTEM

(71) Applicant: Rapitag GmbH, Munich (DE)

(72) Inventors: Sebastian Müller, Munich (DE); Alexander Schneider, Munich (DE)

(73) Assignee: Rapitag GmbH, Munich (DE)

( * ) Notice: Subject to any disclaimer, the term of this patent is extended or adjusted under 35 U.S.C. 154(b) by 29 days.

(21) Appl. No.: 17/770,891

(22) PCT Filed: Oct. 23, 2020

(86) PCT No.: PCT/EP2020/079896

§ 371 (c)(1),
(2) Date: Apr. 21, 2022

(87) PCT Pub. No.: WO2021/078945

PCT Pub. Date: Apr. 29, 2021

(65) Prior Publication Data

US 2022/0375321 A1 Nov. 24, 2022

(30) Foreign Application Priority Data

Oct. 24, 2019 (DE) ..................... 10 2019 216 376.9

(51) Int. Cl.
*G08B 21/02* (2006.01)

(52) U.S. Cl.
CPC ..... *G08B 21/0272* (2013.01); *G08B 21/0227* (2013.01); *G08B 21/0258* (2013.01); *G08B 21/0275* (2013.01)

(58) Field of Classification Search
CPC ............ G08B 21/0272; G08B 21/0227; G08B 21/0258; G08B 21/0275
See application file for complete search history.

(56) References Cited

U.S. PATENT DOCUMENTS 9,030,562 B2 * 5/2015 Petricoin, Jr. ............ G07C 9/28 235/382
2002/0171550 A1 11/2002 Hirose et al.
(Continued)

FOREIGN PATENT DOCUMENTS

DE 10156968 A1 10/2002
DE 102006056856 A1 * 6/2008 ......... G08B 13/1427
(Continued)

OTHER PUBLICATIONS

International Application No. PCT/EP2020/079896, International Search Report and Written Opinion mailed Mar. 16, 2021, 32 pages.
(Continued)

*Primary Examiner* — Mohamed Barakat
(74) *Attorney, Agent, or Firm* — Kilpatrick Townsend & Stockton LLP

(57) ABSTRACT

The invention relates to a security system designed to recognise, by means of the presence and/or content of a status enquiry signal of at least one security unit, whether or not at least one security unit is located inside the security zone. The security system includes an alarm generating unit which is designed to generate an alarm signal if it has been recognised that the at least one security unit is located outside the security zone. The invention further relates to a method for emitting an alarm signal, a bus with a security system and a use of a security system.

16 Claims, 4 Drawing Sheets

(56) References Cited

U.S. PATENT DOCUMENTS

| | | | | |
|---|---|---|---|---|
| 2003/0083044 | A1 | 5/2003 | Schreyer et al. | |
| 2004/0174256 | A1* | 9/2004 | Hershkovitz | G08B 25/008 700/83 |
| 2005/0258975 | A1* | 11/2005 | Hunt | B62B 5/0423 340/686.1 |
| 2007/0080806 | A1* | 4/2007 | Lax | G08B 13/2448 340/572.1 |
| 2008/0107274 | A1* | 5/2008 | Worthy | G06F 21/602 380/278 |
| 2009/0091448 | A1* | 4/2009 | Leyden | G08B 25/10 340/568.2 |
| 2014/0043163 | A1* | 2/2014 | Yang | E05B 73/0052 340/572.1 |
| 2016/0005284 | A1 | 1/2016 | Batra et al. | |
| 2016/0260303 | A1 | 9/2016 | Strulovitch et al. | |
| 2016/0321894 | A1* | 11/2016 | Schneider | G08B 13/242 |
| 2017/0030109 | A1 | 2/2017 | Duncan et al. | |

FOREIGN PATENT DOCUMENTS

| | | | |
|---|---|---|---|
| DE | 102013006978 | A1 | 10/2014 |
| DE | 102019204779 | A1 | 10/2020 |
| EP | 1306822 | A2 | 5/2003 |

OTHER PUBLICATIONS

European Application No. 20797443.7, Office Action mailed Aug. 31, 2023, 12 pages.

* cited by examiner

SECURITY SYSTEM, METHOD OF EMITTING AN ALARM SIGNAL, BUS, USE OF A SECURITY SYSTEM

CROSS REFERENCE TO RELATED APPLICATION

This application is a U.S. national phase of International Patent Application No. PCT/EP2020/079896 filed on Oct. 23, 2020, which claims priority to German Patent Application No. 10 2019 216 376.9, filed in Germany on Oct. 24, 2019. The entire contents of both applications are hereby incorporated herein by this reference.

The invention relates to a security system, a bus comprising a security system, and the use of a security system.

Security systems for preventing theft of goods from a publicly accessible region, for example, from a department store, are well known. Anti-theft systems, such as electronic article surveillance (EAS) which includes electromagnetic (EM), radio-frequency (RF), and acoustomagnetic (AM) systems, are typically used for this purpose. In such anti-theft systems, anti-theft devices fastenable to the goods to be secured can be recognised by detector units that are usually arranged at the exits of sales regions. The detector units are designed to emit an acoustic and/or visual warning signal if an anti-theft device is located in the detection region between two detector units which are usually arranged at a distance of, for example, up to 2 m or 4 m from one another.

Therefore, the disadvantage of the mentioned anti-theft device is that detection outside the detection range of the detector units is not possible. For example, if the publicly accessible region to be secured is not structurally delimited, i.e., there are no defined exits, the entire region would have to be covered with detector units in order to ensure effective protection against theft. This is not only relatively expensive, since many detector units are required but is usually not possible structurally, especially if the region to be secured is not locally defined, for example, if it is located around a mobile sales stand. This is the case, for example, with mobile sales stands. In these cases, a display of goods is usually out of the field of vision of the vendor, which makes it possible for unauthorised persons to steal these goods.

The prevention of theft is not only of great importance in the retail industry but also when securing pieces of luggage for travellers. Recently, the theft of pieces of luggage, such as a suitcase, a backpack, a handbag or the like from coaches has increased.

The fact that the coach stops at several stations, opens the luggage compartment and loads the luggage of individuals who have left and/or boarded the coach is used for theft. During loading, part of the luggage already in the luggage compartment of the bus or temporarily placed in front of the bus for loading is often unattended, which makes their theft by unauthorised persons possible.

Thefts in the retail industry or of personal pieces of luggage cause great financial and personal damage to their owners. In particular, the theft of personal pieces of luggage can also mean a loss of immaterial goods, such as irreplaceable personal objects, or a loss of personal data, for example, if the piece of luggage contains a laptop or a cell phone.

Therefore, the problem addressed by the present invention is that of providing a security system, a method for emitting an alarm signal, a bus, and a use of the security system, by means of which theft can be prevented, even if the region from which theft is to be prevented is structurally not separated from the environment.

According to a first aspect, this problem is solved according to the invention by a security system which comprises a central unit, at least one security unit which is connected via a wireless connection to the central unit and comprises a security unit receiving unit, and a predetermined security zone which extends around the central unit and in which the wireless connection between the central unit and the at least one security unit exists. According to the invention, the central unit comprises a central unit transmitting unit which is designed to transmit a status enquiry signal to the at least one security unit via the wireless connection, said security system being designed to recognise, by means of the presence and/or content of the status enquiry signal, whether or not the at least one security unit is located inside the security zone. Furthermore, the security system according to the invention comprises an alarm generating unit which is designed to generate an alarm signal if it has been recognised that the at least one security unit is located outside the security zone.

The presence of the predetermined security zone in the security system makes it possible to determine precisely whether or not the at least one security unit is located inside this security zone. The security unit can also be designed to be detachably attached to or in an object. When the at least one security unit is attached to or in an object, such as a piece of merchandise or luggage, the security system can thus determine whether the object is located inside the security zone. A structural delimitation of the security zone, i.e., the region to be secured, is therefore not necessary.

Whether the at least one security unit is located in the security zone can be recognised in that the central unit transmits the status enquiry signal continuously or at a certain transmission frequency by means of the central unit transmitting unit, and the security unit receives the status enquiry signal by means of the security unit receiving unit. According to one possibility, the security system can recognise, based on the presence of the status enquiry signal, i.e., when the status enquiry signal is received, that the at least one security unit is located inside the security zone, whereas an absence of the status enquiry signal can indicate that the at least one security unit is not located inside the security zone.

An absence or non-presence of the status enquiry signal for a predetermined duration, for example, a duration of less than 1 second, may indicate that the at least one security unit is not located inside the security zone. A faulty alarm signal, for example, due to a signal disturbance, can be prevented by means of the predetermined duration.

The alarm generating unit can be comprised by the central unit or the at least one security unit or a mobile terminal to be defined later. It can emit an alarm signal assigned to the at least one security unit if it has been recognised that the at least one security unit is located outside the security zone. The alarm signal can be an acoustic signal, a visual signal and/or a digital signal. The alarm signal can be generated by the central unit and/or the security unit and/or the mobile terminal. By means of the alarm generating unit and the thus generated alarm signal, a person using the security system can recognise very quickly whether the at least one security unit or an object secured with it is located inside the security zone.

The security unit can be designed to generate the alarm signal within a duration of less than one second. For example, if the security unit receiving unit does not receive a status enquiry signal from the central unit within the predetermined duration, it can inform the alarm generating unit, so that said alarm generating unit can immediately generate the alarm signal.

Effective prevention of theft of an object secured with the at least one security unit can be achieved if the at least one security unit itself can emit an alarm signal. It can thus be indicated to the environment that the object secured with the at least one security unit is or was removed from the security zone in an undesired manner.

The at least one security unit therefore preferably has the alarm generating unit which is designed to generate a security unit alarm signal when the at least one security unit has recognised that it is located outside the security zone. The security unit alarm signal can be an acoustic signal, a visual signal and/or a digital signal.

The alarm generating unit of the at least one security unit can be designed to emit the alarm signal if the security unit has not received a status enquiry signal from the central unit within a predetermined duration, for example, a duration of less than one second. A faulty alarm signal, for example, due to a signal disturbance, can be prevented by means of the predetermined duration. This configuration is particularly advantageous if a decision is made, by means of the presence of the status enquiry signal, whether the at least one security unit is located outside the security zone.

In order to enable two-way communication between the central unit and the at least one security unit, it is proposed, for example, that the at least one security unit further comprises a security unit transmitting unit which is designed to transmit a status information signal, and the central unit comprises a central unit receiving unit which is designed to receive the status information signal from the at least one security unit.

Whether the at least one security unit is located in the security zone can be recognised in that the at least one security unit transmits the status information signal continuously or at a specific transmission frequency by means of the security unit transmitting unit, and the central unit receives the status information signal by means of the central unit receiving unit. According to one possibility, the security system can recognise, based on the presence of the status information signal, i.e., when the status information signal is received, that the at least one security unit is located inside the security zone, whereas an absence of the status information signal can indicate that the at least one security unit is not located inside the security zone.

An absence or non-presence of the status information signal for a predetermined duration, for example, a duration of less than 1 second, can indicate that the at least one security unit is not located inside the security zone. A faulty alarm signal, for example, due to a signal disturbance, can be prevented by means of the predetermined duration.

According to another possibility, the status information signal can contain information about where the at least one security unit is located. This information can be, for example, a reception strength of the status information signal or position information.

The central unit can have the alarm generating unit which is designed to generate a security unit alarm signal if the at least one security unit has recognised that it is located outside the security zone. Consequently, the alarm generating unit can be present both in the at least one security unit and in the central unit.

In a development of the invention, it is preferred that the security zone is defined by the range achievable by means of the wireless connection, within which signals can be transmitted, and that said range is defined by a transmission power of the central unit transmitting unit and/or a detection rate of the central unit receiving unit such that it is less than 40 m, preferably less than 30 m.

If, for example, a Bluetooth standard protocol is used, a range of 40 m (metres) around the transmitting unit can be achieved with conventional standard components. This means that the security zone would have an extension, corresponding to the range, of 40 m around the central unit. However, some applications require a smaller extension of the security zone. For example, a shop surface for selling goods may only have a circumference of 20 m or 10 m. In the case of an application in a bus, for example, a coach, an extension of 5 m to 35 m can be advantageous in order to have a sufficiently large region available for loading luggage inside the security zone and to be able to quickly detect and, optionally, prevent a theft of the object. It goes without saying that a smaller security zone, in this case, for example, a range of 5 m, allows for quicker detection of a theft of the object by an unauthorised person.

In a development of the invention, the range achievable by means of the wireless connection is adjustable. In this way, the extension of the security zone can be adjusted to the respective application and the security system can be used flexibly for different applications.

In one embodiment, the range of the wireless connection can determine the extension of the security zone. It goes without saying that in this way, it can be recognised by means of the presence of the status information signal and/or the status enquiry signal whether the at least one security unit is located inside the security zone because a signal transmission by means of the wireless connection can no longer be possible outside the range of the wireless connection.

The security system can also comprise a mobile terminal. The mobile terminal can be connected to the central unit and/or the at least one security unit, and preferably comprises a receiving unit which is designed to receive the status information signal and/or the alarm signal and to emit an alarm message based thereon, and a display device which is designed to display the alarm message and/or to display whether or not the at least one security unit is located inside the security zone. Since a mobile terminal is usually carried close to a person, this person can be informed within a very short time, for example, within a few seconds, that an object secured with the at least one security unit is not located inside the security zone. Furthermore, it can increase the comfort of the person owning the mobile terminal if said person is shown that the at least one security unit is located inside the security zone.

In an exemplary embodiment, the mobile terminal comprises the, or a further, alarm generating unit and the central unit transmits the information about the absence of the status information signal by means of a wireless connection to the alarm generating unit of the mobile terminal. Alternatively or additionally, it is also possible that the security unit transmits the information about the absence of the status enquiry signal to the mobile terminal.

The attention of the owner of the mobile terminal can be increased if the alarm message is a push-up message displayed by the display device.

The mobile terminal can also comprise application software, by means of which the at least one security unit can be assigned to a specific object to be secured or to an attribute assigned thereto, e.g., its owner. This assignment can be temporary. For example, the at least one security unit can be assigned to a person to be transported by the bus and/or to a specific seat on the bus for a duration of the travel time. If the mobile terminal has a GPS receiver, the at least one security unit can, for example, be assigned to a person to be transported by the bus until the mobile terminal indicates that this person has reached an assigned travel destination.

In one possible embodiment, the central unit and/or the at least one security unit can be designed to repeatedly transmit a signal assigned to a security unit to the mobile terminal by means of the wireless connection. This means that communication between the central unit, the at least one security unit and the mobile terminal preferably takes place via the wireless connection. It goes without saying that in this way, a signal assigned to the at least one security unit can only be received by the mobile terminal if it is located in a transmission or reception range of the wireless connection. This allows for a simple configuration of the mobile terminal and the central unit and/or the at least one security unit, since all the transmitting and receiving units can be designed to only receive signals according to a standard protocol.

In another possible embodiment, the central unit and/or the at least one security unit can be designed to repeatedly transmit a signal assigned to a security unit to the mobile terminal by means of a further wireless connection. This means that the further wireless connection can differ from the wireless connection present at least inside the security zone and preferably also allow for a signal transmission outside the security zone.

The further wireless connection can be, for example, a mobile phone connection and the mobile terminal can be, for example, a mobile phone which can receive mobile phone data. It goes without saying that for this exemplary embodiment, at least the central unit and the at least one security unit preferably comprises a transmitting unit designed to transmit mobile phone signals.

The signal assigned to the security unit can be the status information signal which provides information about whether or not the at least one security unit is located inside the security zone. For example, the application software of the mobile terminal can be designed to recognise, by means of the presence and/or content of the status information signal of the at least one security unit, whether or not the at least one security unit is located inside the security zone.

Alternatively or additionally, the signal assigned to the security unit can be the alarm signal if it has previously been recognised that the at least one security unit is located outside the security zone.

The mobile terminal can be, for example, a smartphone belonging to an owner of an object to be secured with the at least one security unit. However, the mobile terminal can also be assigned to an operator of the security system, for example, a bus driver, who can use the mobile terminal and an application software to assign the at least one security unit to an object or its owner. This means that the application software of the mobile terminal can be designed to assign the at least one security unit to an object or its owner.

The at least one security unit can be assigned to an object to be secured with it or to attributes assigned to said object, such as its owner, by coupling the mobile terminal to the at least one security unit. For this purpose, the connection between the mobile terminal and the at least one security unit is preferably a secure connection, the mobile terminal preferably having a coupling means for coupling the at least one security unit to the mobile terminal, and the at least one security unit having a coupling element. It goes without saying that the coupling can also be decoupled again, as a result of which the security unit can be used again.

A possible coupling element is, for example, a barcode on the at least one security unit. The barcode can be linked to a MAC address or a default name, for example, a Bluetooth default name. Furthermore, a signal via near field communication (NFC) or a signal via identification by means of electromagnetic waves (RFID) can represent a coupling element. Corresponding coupling means can therefore be a barcode scanner, a Bluetooth receiver, an NFC or an RFID signal reader.

Additionally or alternatively, the mobile terminal and the at least one security unit can also be coupled by means of the central unit. For example, the central unit can output or display an identification assigned to the at least one security unit, for example, a name or a number, in response to a manual input. A person can then remember this identification.

However, in a development of the invention, it is proposed that a transmitting unit of the mobile terminal and/or the security unit transmitting unit of the at least one security unit is/are designed to transmit coupling information to the central unit, the central unit being optionally designed to receive the coupling information by means of the coupling information receiving unit and to store it in a storage device. In this way, a comprehensible coupling can be ensured, making it even more difficult for unauthorised persons to gain access to an object secured with the at least one security unit. The storage device for the coupling information can be arranged in the central unit or be a server comprised by the security system, which can be accessed, for example, by the central unit and/or the mobile terminal. It goes without saying that the coupling information can be transmitted to the central unit and/or the server by means of the wireless connection or the further wireless connection.

For example, an owner of an object to be secured can bring the coupling means of the mobile terminal, for example, a Bluetooth receiver, within range of the coupling element of the at least one security unit, for example, a Bluetooth default name, and transmit this coupling information to the central unit and/or the server.

The central unit can also be designed to transmit the alarm signal to the mobile terminal which is coupled to the at least one security unit. Furthermore, the alarm signal can be transmitted to a plurality of mobile terminals if they are mobile terminals coupled to the at least one security unit. For a secure assignment of the plurality of security units, the mobile terminal, which is assigned to an operator of the security system, can have access rights to all of the plurality of security units, whereas the mobile terminal of an owner of an object to be secured can only have access rights to the security unit assigned to said owner.

The at least one security unit can have an internal, preferably rechargeable, energy storage unit, by means of which energy required for the effectiveness of the security unit can be provided. The energy storage unit can be a battery.

In one development of the invention, the at least one security unit can have a locking mechanism which can be unlocked in response to an unlocking signal received by the security unit. The unlocking signal is preferably an encrypted signal and can be transmitted, for example, by the mobile terminal coupled to the security unit to be unlocked, or by the mobile terminal of an operator with appropriate access rights to the security unit to be unlocked.

The at least one security unit can be attached, for example, to a piece of luggage, for example, a suitcase, a backpack, a handbag or the like, such that the piece of luggage is locked by said security unit. For example, opening a zip fastener can be prevented by means of the at least one security unit.

The unlocking signal can be transmitted to, and received by, the security unit by means of the wireless connection and/or the further wireless connection. The unlocking signal can be encrypted by means of an encryption standard, e.g., AES (advanced encryption standard), e.g., encryption length of 128, 160, 192, 224, or 256 bits. The encryption length is preferably 128 bits.

The at least one security unit can be designed to receive the unlocking signal via the wireless connection or the further wireless connection. The unlocking signal can be transmitted by the central unit or the mobile terminal.

Each securing can comprise a special opening token which is stored, for example, on a server comprised by the security system. If the at least one security unit is to be opened by means of the mobile terminal, the mobile terminal can receive said opening token via the wireless connection or the further wireless connection by means of the application software. The mobile terminal can then transmit the opening token to the at least one security unit via the wireless connection or the further wireless connection, for example, by means of Bluetooth and/or NFC, and thus unlock the locking mechanism.

The locking mechanism can comprise an electromechanical actuator which can be actuated upon receiving the unlocking signal such that it can unlock the locking mechanism. The energy storage unit of the at least one security unit can provide the energy required to actuate the actuator.

The locking mechanism can be designed as described in the patent application with application number 10 2019 204 779.3 of the same applicant, in which an anti-theft device attachable to objects such as textiles is described, which can be coupled to a mobile terminal of a user and unlocked by said user upon wirelessly receiving an unlocking signal. In addition, a product based on this principle is already being sold by Rapitag GmbH and used in the retail industry to simplify the payment process. The customer can connect to the anti-theft device attached to an object via a wireless connection using a mobile terminal and appropriate user software and carry out a payment process, after which the anti-theft device can be unlocked.

Furthermore, patent application US 2016/0260303 A1 describes the unlocking of a security tag by a customer, in which case a wireless command signal is transmitted to the security tag, whereupon an actuator in the security tag is activated and the lock of the security tag is opened.

The at least one security unit can additionally or alternatively have an input device, by means of which the unlocking signal can be generated. For example, the input device can be a button or a touchpad, by means of which the unlocking signal can be entered in the form of a code. The code can be a numerical code, a number code, or a combination thereof, or a specific button-press frequency, such as a sequence of Morse characters.

The at least one security unit can also have a lock unit, by means of which the locking mechanism can be opened manually using a corresponding key.

In a further development of the invention, it is proposed that the at least one security unit is transferable into an activated state and a deactivated state, with the alarm generating unit preferably not emitting an alarm signal in the deactivated state of the at least one security unit, even if the at least one security unit is not located inside the security zone, and the security unit transmitting unit is preferably designed to emit at least one deactivation signal. In this way, false signals and the transmission of signals and the associated energy consumption can be prevented.

The deactivation signal can inform the central unit and/or the mobile terminal about the deactivated state of the at least one security unit. Therefore, an alarm signal can be prevented, which would otherwise be triggered by the security system, e.g., the central unit, the security unit and/or the mobile terminal, if the presence and/or content of the status information signal indicates that the security unit is no longer located inside the security zone.

The at least one security unit can be in the deactivated state during a charging process of the energy storage unit. For example, the central unit can serve as a charging station for the security unit and the at least one security unit can be transferred to the deactivated state when it is in the charging station.

The or a charging station for the energy storage unit can be connectable by means of an onboard supply of a bus, for example, be provided with energy by means of a 12V connection of the bus.

Furthermore, the at least one security unit can be deactivated from a distance, i.e., remotely, if the central unit and/or the mobile terminal transmits a signal for remote deactivation to the at least one security unit. An input by the mobile terminal and/or the central unit can, for example, specifically activate or deactivate one, a plurality of, or all security units.

If the security system is used, for example, to secure pieces of luggage on a bus, e.g., a coach, the at least one security unit is transferable into a deactivated state by means of a command from the central unit and/or the mobile terminal during an extended drive without a stop in which the bus is locked and there is no risk of theft. In this way, the energy consumption of the at least one security unit can be reduced.

In order to prevent the security units from being stolen in the deactivated state, unlocking the locking mechanism can be prevented in the deactivated state.

In general, it is proposed that the wireless connection can consist of a Bluetooth connection, a WLAN connection, a mobile phone connection, and an infrared connection. The further wireless connection can be designed in the same way. These connection technologies are established and known for stable signal transmission.

However, infrared has the disadvantage that visual contact between transmitter and receiver is required for the wireless connection. Therefore, an infrared connection can only be used to a limited extent for applications in which obstacles, such as bus walls, have to be overcome. Bluetooth and WLAN are common wireless connection technologies which have a sufficient connection range even through obstacles such as bus walls and, in contrast to mobile phone connections, do not depend on the positioning of transmitter masts. In a preferred embodiment, the wireless connection can be Bluetooth and the further wireless connection can be cellular.

In a case in which the at least one security unit has GPS support and mobile phone access, the position of the at least one security unit can be determined by means of GPS or a mobile phone.

In retail and also on bus trips, usually a large number of objects have to be secured. It may therefore be desirable for the security system to comprise a plurality of security units, each of which having a personal identification, the central unit possibly being designed to assign the status enquiry signal and/or the status information signal on the basis of the personal identification of each security unit to one of the security units from the plurality of security units. Each of the plurality of security units preferably corresponds to the at least one security unit described above. For example, each security unit can have an identification.

The at least one security unit or the plurality of security units can be coupled to the central unit, i.e., they were wirelessly connected to one another at least once, so that the central unit knows the identification of the at least one security unit or the plurality of security units.

Each of the plurality of security units can also be coupled to the mobile terminal. The mobile terminal can be connected to a selected security unit of the plurality of security units by means of the personal identification. The connection can be secured as previously described. The identification can preferably be realised by means of a MAC address assigned to each of the security units or a hard-coded and unchangeable default name assigned to each of the security units or an RFID chip present in each of the security units. For example, Bluetooth can be used together with a hard-coded and unchangeable default name.

In a preferred embodiment, the security system comprises a number of security units which corresponds to the number of seats on a bus, twice the number of seats on a bus or a number in between. In this way, one to two pieces of luggage of a passenger travelling on the bus can be provided with a security unit.

In some cases, the security zone to be secured is larger than the range of the wireless connection or should deviate from a somewhat circular shape of the security zone. It can therefore be advantageous if the central unit comprises a plurality of subunits, each of which comprising a transmitting unit which is designed to transmit the status enquiry signal to the at least one security unit via the wireless connection, and a receiving unit which is designed to receive the status information signal from the at least one security unit, the alarm generating unit being designed to generate an alarm signal if it has been recognised by one, preferably all, of the plurality of subunits, by means of the presence and/or the content of the status information signal of the at least one security unit, that the at least one security unit is located outside the security zone.

Each subunit can be designed to recognise by means of the status information signal of the at least one security unit whether or not the at least one security unit is located inside the security zone, and each subunit being designed to generate an alarm signal. A corresponding status information signal from one of the subunits can be sufficient to ensure that no alarm signal is generated by the alarm generating unit. An absence of the status information signal can indicate that the at least one security unit is not located inside the security zone.

In one embodiment in which it can be recognised by means of the presence of the status information signal whether or not the security unit is located inside the security zone, an alarm signal can only be generated if none of the subunits receives the status information signal in order to avoid false signals.

The extension of the security zone can be adjusted according to the desired requirements by means of the plurality of subunits. If, for example, the security zone is to be present in a region around a bus, a plurality of subunits can be arranged along the longitudinal direction of the bus. A security zone can thus be formed which roughly corresponds to the shape of the bus and extends beyond the bus, for example, in a radius of 5 m to 35 m around the bus.

The security zone can be defined by the range achievable by means of the wireless connection, within which signals can be transmitted. This range can be defined by a transmission power of the subunits and/or a detection rate of the subunits such that it extends no more than 40 m, preferably no more than 30 m, away from one of the subunits. In other words, the security zone surrounds each of the subunits and a distance between each subunit and one end of the security zone is less than 40 m, preferably less than 30 m.

The subunits are preferably connected to one another, and the security system is designed to evaluate the status information signals received from the subunits according to their reception strength by means of trilateration, so that a position of the at least one security unit can be determined. A position of the at least one security unit inside the security zone can thus be determined. In a case in which the wireless connection also exists outside the security zone, trilateration can be used to determine whether or not the at least one security unit is located inside the security zone.

The subunits can be connected to one another by means of the wireless connection or a wired connection. A wire-based, for example, wired, connection is advantageous in the case of a permanent installation of the subunits. For example, three or more subunits can be permanently installed in a bus and optionally connected to one another by wire.

For example, the central unit can be formed from at least three, preferably four, subunits which are arranged spaced apart from one another and whose respective receiving units receive the status information signal from the at least one security unit, and the central unit can be designed to use previously known positions of the respective receiving units and the signal strength of the status information signals to determine a position of the at least one security unit by means of triangulation. In a case in which the wireless connection also exists outside the security zone, triangulation can be used to determine whether or not the at least one security unit is located inside the security zone.

In order to allow for a sufficiently good determination, the status information signals for position determination by means of trilateration or triangulation should be transmitted with a transmission frequency in the millisecond range or with a faster transmission frequency.

Position determination by means of trilateration or triangulation is also possible for each of the plurality of security units, since the subunits can assign each status information signal to exactly one security unit from the plurality of security units by means of the personal identification of each security unit. The status information signals can thus be calculated separately for each security unit.

For more precise details on the execution of the trilateration method and the triangulation method, reference is made to the relevant literature, such as the textbook “Local Positioning Systems: LBS Applications and Services” by authors Krzysztof W. Kolodziej and Johan Hjelm, published by Taylor & Francis Ltd.

According to a second aspect of the invention, a method for emitting an alarm signal is provided, comprising the steps: connecting a central unit to at least one security unit by means of a wireless connection; determining a security zone which extends around the central unit and in which the wireless connection between the central unit and the at least one security unit exists; transmitting a status enquiry signal by the central unit by means of a central unit transmitting unit; receiving the status enquiry signal of the central unit by the at least one security unit by means of a security unit receiving unit; determining by the security system, by means of the presence and/or content of the status enquiry signal, whether or not the at least one security unit is located inside the security zone; and generating an alarm signal by an alarm generating unit if it is determined that the at least one security unit is not located inside the security zone. The method according to the invention solves the initially addressed problem in the same way as the security system and the aforementioned advantages are achieved in an analogous manner.

The method can preferably be carried out by means of a security system according to the first aspect of the invention.

Furthermore, the method can comprise the steps of transmitting a status information signal by a security unit transmitting unit of the at least one security unit; and receiving the status information signal by a central unit receiving unit of the central unit and determining by the central unit, by means of the status information signal, whether or not the at least one security unit is located inside the security zone.

According to a third aspect of the invention, a bus is provided, which comprises a security system according to the first aspect of the invention. The bus according to the invention solves the initially addressed problem in the same way as the security system and the aforementioned advantages are achieved in an analogous manner.

According to a fourth aspect of the invention, a use of a security system according to the first aspect of the invention is provided for securing an object on a bus. The use according to the invention solves the initially addressed problem in the same way as the security system and the aforementioned advantages are achieved in an analogous manner.

According to a fifth aspect of the invention, a security system is provided, which comprises: a central unit, at least one security unit which is connected via a wireless connection to the central unit and has a security unit transmitting unit which is designed to transmit a status information signal, a predetermined security zone which extends around the central unit and in which the wireless connection between the central unit and the at least one security unit exists, the central unit comprising a central unit receiving unit which is designed to receive the status information signal from the at least one security unit via the wireless connection, said security system being designed to recognise, by means of the presence and/or content of the status information signal, whether or not the at least one security unit is located inside the security zone, and an alarm generating unit which is designed to generate an alarm signal if it has been recognised that the at least one security unit is located outside the security zone.

The security system according to the fifth aspect of the invention can be combined with all of the features described in this disclosure.

The invention will be explained in more detail below with reference to the accompanying drawings, in which.

Figure 1:
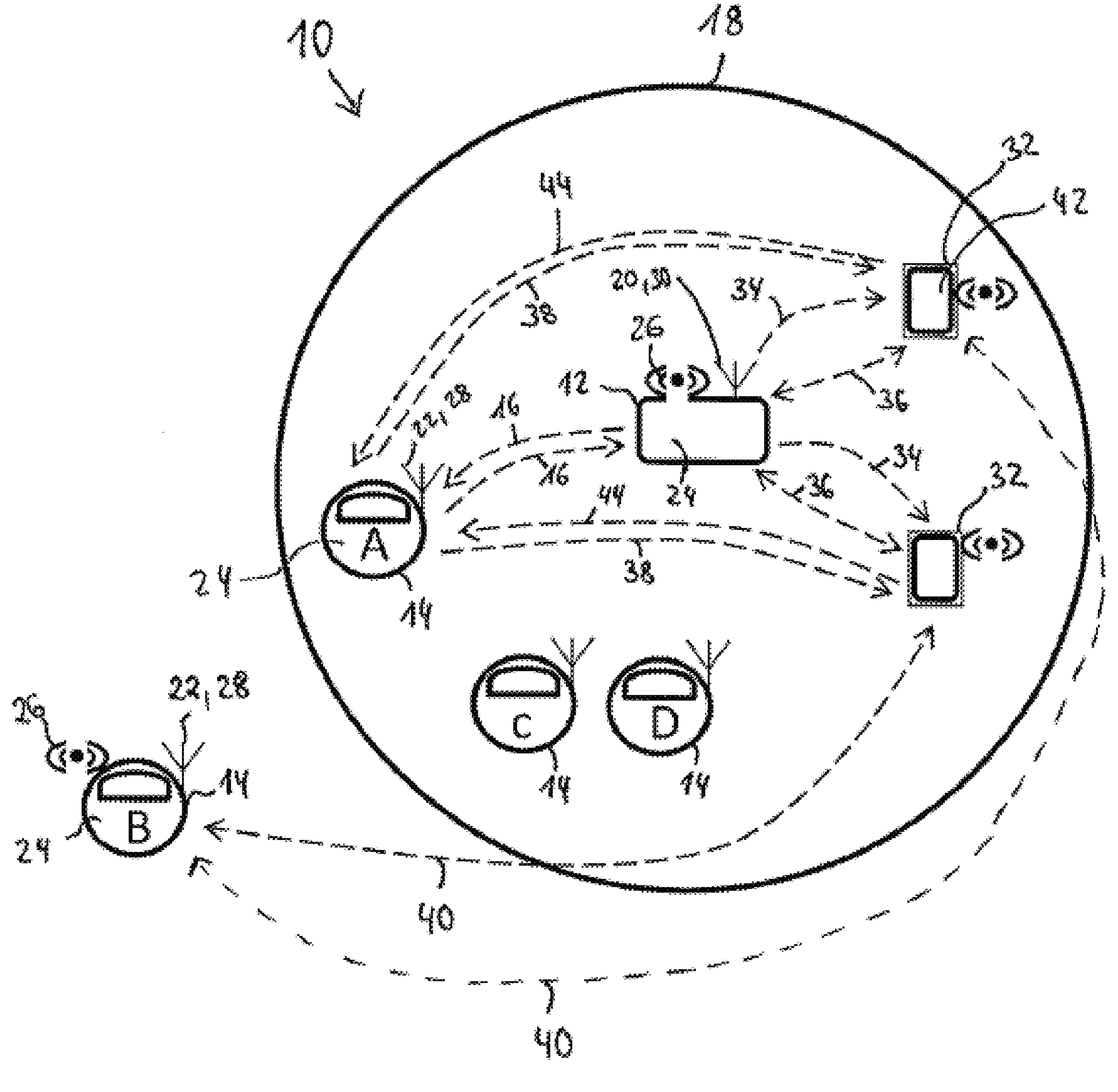
FIG. 1 shows a schematic representation of a security system according to the invention according to a first embodiment.

In FIG. 1, a security system according to the invention is in general denoted by 10. The security system 10 comprises a central unit 12 and at least one security unit 14 which is connected to the central unit 12 via a wireless connection 16. Furthermore, the security system 10 comprises a predetermined security zone 18 which extends around the central unit 12 and in which the wireless connection 16 between the central unit 12 and the at least one security unit 14 exists. The central unit 12 comprises a central unit transmitting unit 20 which is designed to transmit a status enquiry to the at least one security unit 14 via the wireless connection 16. The at least one security unit 14 can receive the status enquiry signal by means of a security unit receiving unit 22.

According to a first embodiment of the invention, the at least one security unit 14 can recognise, by means of the presence of the status enquiry signal from the central unit 12, whether or not it is located in the predetermined security zone 18. This is possible, for example, in that the security zone 18 is defined by an achievable range of the wireless connection 16. In other words, as long as the at least one security unit 14 receives the status enquiry signal, it is located inside the security zone 18, and when the at least one security unit 14 no longer receives the status enquiry signal, it is located outside the security zone. In FIG. 1, a security unit 14 denoted by the letter B indicates a position outside the security zone.

The wireless connection can be a Bluetooth connection, the range of which is approximately 5 m to 35 m.

The security system 10 also comprises an alarm generating unit 24 which is designed to generate an alarm signal 26 if it has been recognised that the at least one security unit 14B is located outside the security zone 18.

For example, the at least one security unit 14 can comprise the alarm generating unit 24 and emit an alarm signal 26 in the form of an acoustic signal if it has recognised that it is located outside the security zone 18. Such a signal on the at least one security unit 14 can prevent an unauthorised person from stealing an object secured with the at least one security unit 14.

In addition, it may be desirable for the central unit 12 to also be able to recognise, by means of communication with the at least one security unit 14, whether or not the at least one security unit 14 is located inside the security zone 18. This is possible, for example, in that the at least one security unit 14 also comprises a security unit transmitting unit 28 which is designed to transmit a status information signal, and in that the central unit 12 comprises a central unit receiving unit 30 which is designed to receive the status information signal from the at least one security unit 14. In this way, the central unit 12 can recognise, by means of the absence of the status information signal from the at least one security unit 12, that the at least one security unit 14 is located outside the security zone 18.

In such a case, it is advantageous if the central unit 12 also has an alarm generating unit 24 which is designed to generate an alarm signal 26 if it has been recognised that the at least one security unit 14 is located outside the security zone 18.

The security system can comprise a plurality of security units 14A, B, C, D. For the sake of clarity, not all possible wireless connections of the plurality of security units 14A, B, C, D are illustrated in FIG. 1. Nevertheless, all security units 14A, B, C, D can communicate with the central unit 12 via the wireless connection 16 in the same way. This means that each security unit 14A, B, C, D can receive the status enquiry signal from, or transmit the status information signal to, the central unit 12.

Each security unit of the plurality of security units 14A, B, C, D can have a personal identification. This identification can be, for example, a security ID which is individual for each security unit 14A, B, C, D. This can be, for example, a consecutive number or a consecutive letter, e.g., a non-changeable Bluetooth default name. In this way, the central unit 12 can assign the status enquiry signal and/or the status information signal to exactly one security unit from the plurality of security units 14A, B, C, D by means of the personal identification.

Easier operability and thus increased user-friendliness can be achieved if the security system 10 also comprises a mobile terminal 32 which is connected to the central unit 12 and/or the at least one security unit 14. The mobile terminal 32 can comprise a receiving unit which is designed to receive the status information signal and/or the alarm signal and to emit an alarm message based thereon.

If the mobile terminal 32 is located inside the security zone 18, i.e., within the range of the wireless connection, it can be used to transmit the status information signal and/or the alarm signal to the mobile terminal 32. In some cases, however, the mobile device 32 may be outside the range of the wireless connection 34. For such a case, the central unit 12 and the mobile terminal 32 can be equipped with means for transmitting mobile phone data, which can make possible a transmission of the status information signal and/or the alarm signal by means of a mobile phone connection 36.

It goes without saying that the mobile terminal 32 can also receive the status information signal and/or the alarm signal from the at least one security unit 14 by means of the wireless connection 38. In a case in which the at least one security unit 14 also has means for transmitting mobile phone data, the mobile terminal 32 can receive the status information signal and/or the alarm signal from the at least one security unit 14 by means of a mobile phone connection 40.

The mobile terminal 32 can comprise a display device 42 on which the alarm message can be displayed, for example, in the form of a push-up message. Furthermore, the display device 42 can indicate whether or not the at least one security unit 14 is located inside the security zone 18.

Furthermore, the security system 10 can comprise more than one mobile terminal 32, for example, one which is assigned to an operator of the security system 10 and a further one assigned to a person who intends to secure an object with the at least one security unit 14. Both mobile terminals 32 can be designed in the same way. Both mobile terminals 32 can comprise application software that controls access rights to the at least one security unit 14. For example, the mobile terminal 32 assigned to the operator can have access to all security units 14A, B, C, D, whereas the other mobile terminal 32 can only have access right to a security unit assigned to it, for example, the security unit 14A.

Coupling between the mobile terminal 32 and the at least one security unit 14 can be made possible, for example, in that both the mobile terminal 32 and the at least one security unit 14 are within range of the wireless connection 38, 44 and application software on the mobile terminal 32 releases access to the security unit 14A. By means of the personal identification, it is once again possible to allow for a targeted communication between the terminal and precisely one security unit.

Figure 2:
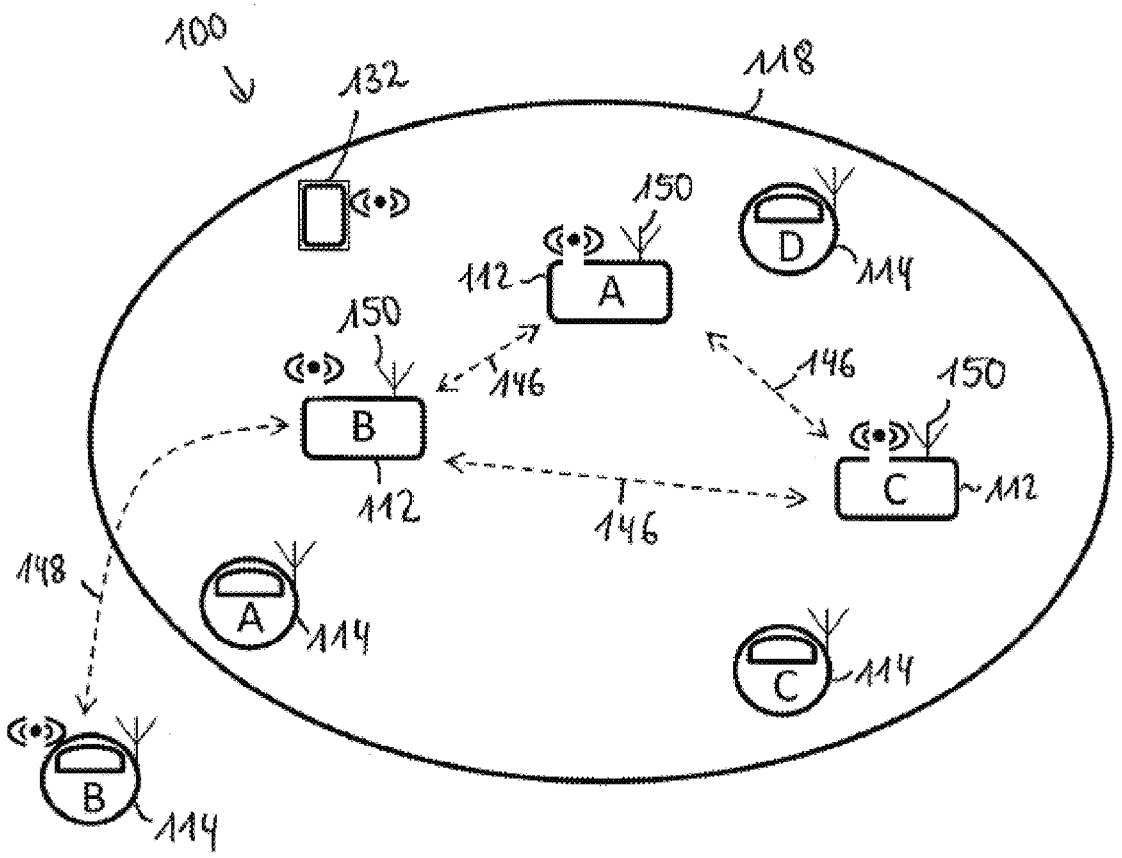
FIG. 2 shows a schematic representation of a security system according to the invention according to a second embodiment.

FIG. 2 shows a second embodiment of a security system 100 according to the invention. The security system 100 essentially corresponds to the security system 10 of the first embodiment. In the following, components contained in both embodiments will not be introduced again. Only differences between the security system according to the first embodiment and the second embodiment will be addressed.

The security system 100 can have a central unit 112 which comprises a plurality of subunits 112A, B, C, each of the subunits 112A, B, C being optionally configured in accordance with the central unit 12, as described in the first embodiment. The subunits can be connected to one another via the wireless connection 146, for example, a Bluetooth connection. Furthermore, the subunits 112A, B, C can communicate with the at least one security unit 114 or the plurality of security units 114A, B, C, D and possibly a mobile terminal 132, as described in the first embodiment, i.e., by means of the wireless connection and/or a further wireless connection. Each of the subunits 112A, B, C can have a receiving unit 150 which can receive, and determine the signal strength of, the status information signal.

In the second embodiment, the security system 100 can be designed to evaluate the status information signals received from the subunits by the at least one security unit 114 according to their reception strength by means of trilateration, so that a position of the at least one security unit 114 can be determined. The wireless connection can therefore extend beyond the predetermined security zone 118, so that a security unit 114B located outside the security zone 118 can also be connected to the subunits 112A, B, C by means of the wireless connection 148, as is shown in FIG. 2, for example, by the connection 148 between the subunit 112B and the security unit 114B.

Furthermore, if the central unit 112 is formed from at least three subunits 112A, B, C, which are arranged spaced apart from one another, the security system 100 can be designed to determine, by means of previously known positions of the receiving units of the subunits 112A, B, C and the signal strength of the status information signal of the at least one security unit 114, a position of the at least one security unit 114 by means of triangulation.

From the calculation of a reception strength of the status information signal at each receiving unit of the subunit 150, it can be calculated from which direction the status information signal is coming and a position of the at least one security unit can thus be determined.

For example, the status information signal of the security unit 114A can be received first by the subunit 112B, then by the subunit 112A and subsequently by the subunit 112C, since a spatial distance covered by the status information signal between the security unit 114A and the subunits 112A, 112B, and 112C can vary. A signal direction of the status information signal of the security unit 114A can be calculated at each subunit 112A, 112B, and 112C, for example, by means of the respective receiving unit 150, based on different propagation times and/or different received signal strengths of the status information signal. The signal direction can be understood to mean the direction from which the status information signal is transmitted. Furthermore, the position of the security unit 114A can ultimately be determined on the basis of the known signal directions. Trilateration or triangulation is used for this purpose. In the case of the security unit 114B shown in FIG. 2, an absence of the status information signal or the status enquiry signal at the subunit 112C could imply that the security unit 114B is located outside the security zone 118.

A propagation time difference of the status information signal to the respective subunits 112A, 112B, and 112C can be a few nanoseconds, for example, it can be between 1 nanosecond and 100 nanoseconds. A reception strength difference of the status information signal to the respective subunits 112A, 112B, and 112C can be measured in dBm.

In one embodiment, a multiplicity of subunits, each of which comprising an antenna, can be arranged in an annular manner, with each subunit or its antenna receiving the signal at a different point in time or with different strengths by means of the respective receiving unit. In this way, the position determination can be improved. It goes without saying that a larger number of subunits or their antennas results in a more precise position determination.

Figure 3:
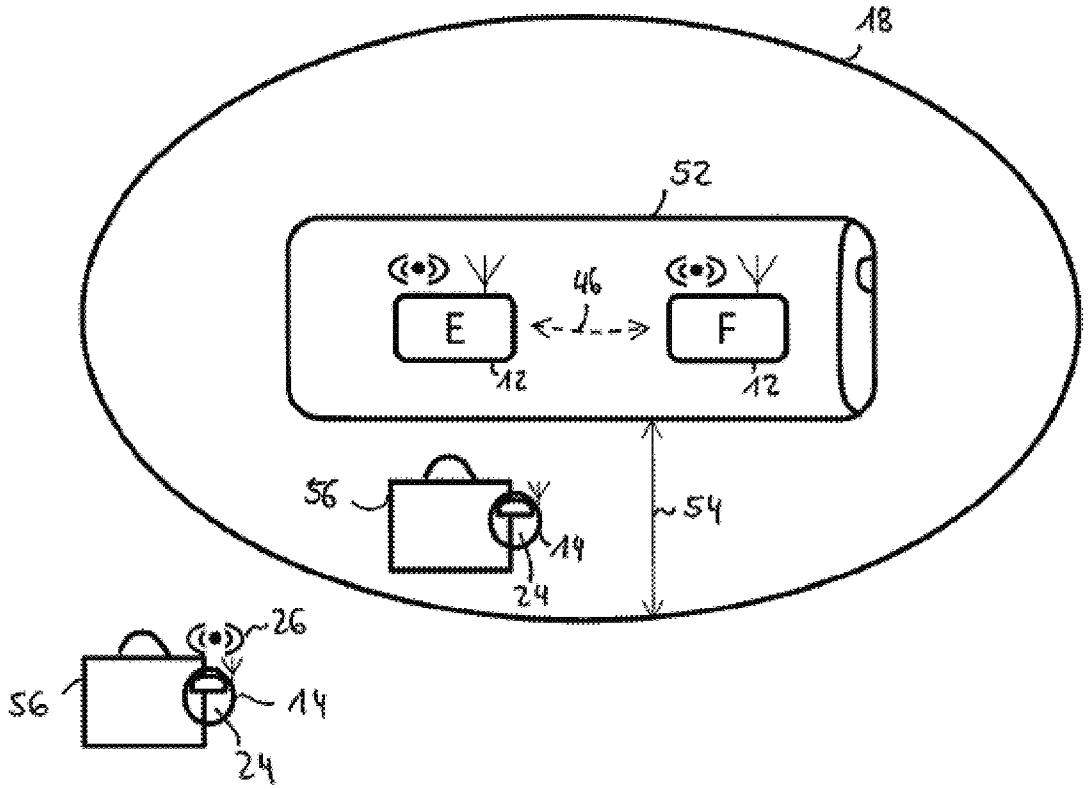
FIG. 3 shows a schematic representation of a bus according to the invention.

FIG. 3 shows a bus 52 according to the invention, which comprises a security system 10. Preferably, the security system according to the first embodiment described above is implemented in this bus 52, but a security system according to the second embodiment could also be implemented in this bus 52.

With regard to the features and mode of operation of the security system 10, reference is made to the previous statements in relation to the first and/or the second embodiment.

In order to achieve a safety zone 18 which extends around the bus 52, it should have an essentially oval shape roughly corresponding to the contours of the bus 52. However, signals are usually emitted evenly in all directions. In order to still achieve a security zone 18 corresponding to the contours of the bus 52, the central unit 12 can be formed from two subunits 12E, F which can be arranged offset in the longitudinal direction in the bus 52. Preferably, the security zone extends around the bus at a distance 54 of approximately 5 to 35 m. In this way, objects 56, such as pieces of luggage 56, can be provided with the at least one security unit 14 inside the security zone 18 and loaded onto the bus 56. The specified region of the security zone 18 thus makes it possible to load objects 56 secured with the security unit 14 onto the bus or to place them in front of the bus again for possible reloading without the security system generating an alarm signal. However, if the object 56 secured with the security unit 14 is moved outside the security zone, the security unit 14 can generate an alarm signal 26 by means of the alarm generating unit 24, as described above in the first embodiment.

Since it is possible that the security unit 14, the central unit 12 and/or the mobile terminal 32 can emit an alarm signal or an alarm message, a passenger whose object 56 is secured with the security unit 14 can also be located outside the visual range of the object belonging to said passenger even during the loading of a plurality of pieces of luggage without having to fear that said object secured with the security unit will be stolen.

The security system according to the second embodiment can also be used in a bus. For example, five subunits, one on each corner of the bus and one in the middle, for example, on the roof, are then preferably used for implementing a position determination of the at least one security unit according to the trilateration method or the triangulation method. Four subunits can also be arranged on each longitudinal side of the bus and, optionally, one subunit can be arranged in the middle. In the simplest case, the subunits are designed to be antennas which have the receiving unit for receiving the status information signal. It goes without saying that one of the subunits can assume more functions than the others.

Figure 4:
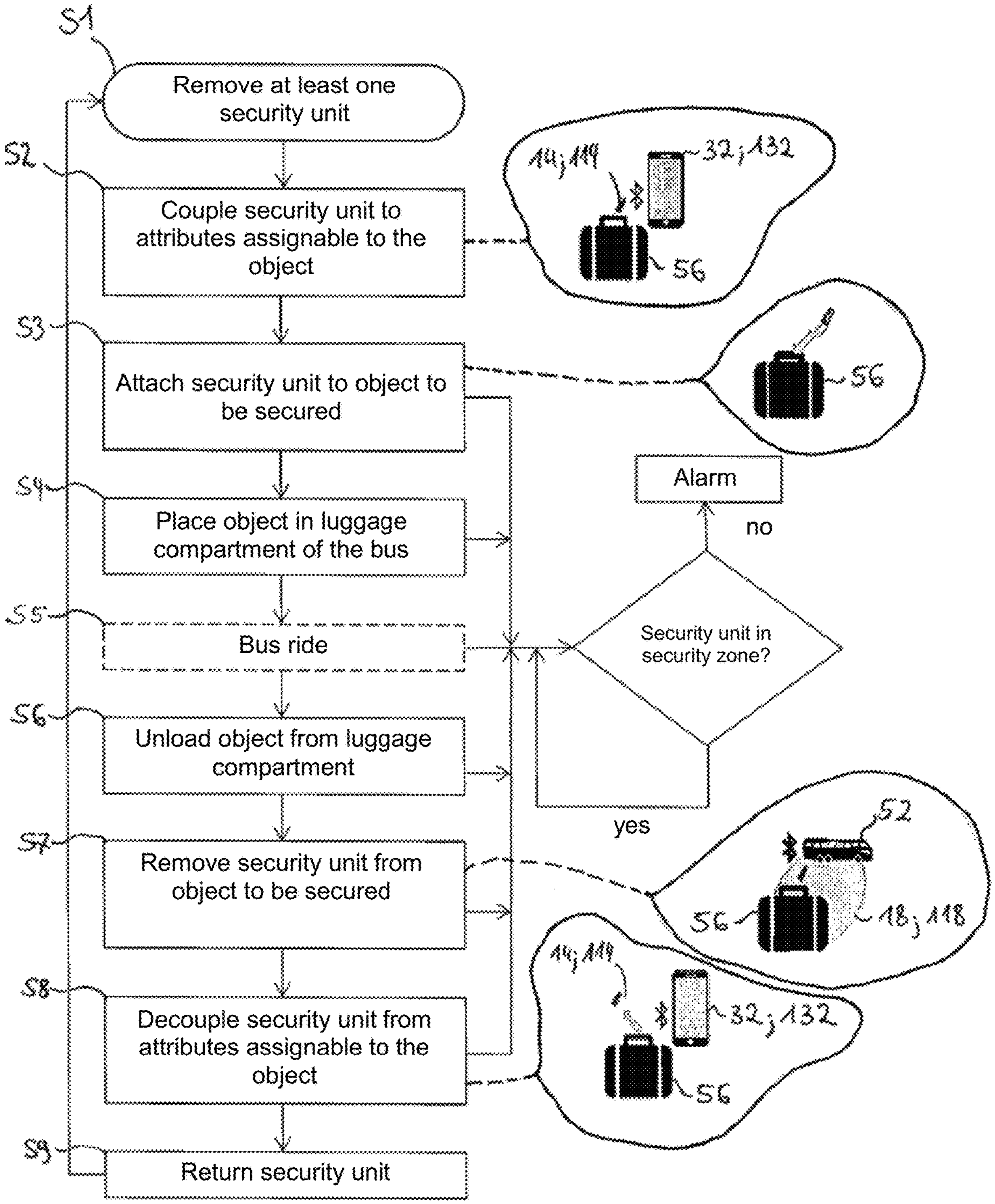
FIG. 4 shows a flowchart for using the security system in a bus.

The flow chart shown in FIG. 4 shows a use of a security system 10, 100 for securing an object 56 on a bus 52.

In a first step S1, the security unit 14, 114 can be removed, for example, from a holder or a charging station of the security system 10, 100. In a subsequent step S2, the security unit 14, 114 can be coupled to attributes that can be assigned to the object. For example, the name of the owner, the travel destination of the owner or a seat on the bus can be used as assignable attributes. For this purpose, the mobile terminal 32, 132 can be coupled to the security unit 14, 114 using a coupling means. For example, the mobile terminal 32, 132 can have a Bluetooth receiver as a coupling means and the security unit 14, 114 can have a Bluetooth default name, as a result of which the mobile terminal 32 can connect to the security unit, preferably by means of a secured connection. After the coupling, a locking mechanism of the security element 14, 114 can be unlocked by means of the mobile terminal 32, 132 which is coupled to the security unit 14, 114. However, other mobile terminals that are not coupled to the security unit 14, 114, for example, those belonging to owners of other objects, cannot open said security unit.

Subsequently, in a step S3, the security unit 14, 114 can be attached to the object 56 to be secured, preferably such that it can only be released again from the object by opening a locking mechanism. Steps S2 and S3 can also be carried out in reverse order.

In a step S4, the object 56 secured with the security unit 14, 114 can now be stored in the luggage compartment of the bus 52 and is secured during the bus ride S5. This security also exists when the bus opens the luggage compartment of the bus, for example, at a service area or when passengers board or disembark, in order to load luggage, for example.

If the secured object 56 or its owner has reached its destination, the object 56 can be unloaded from the luggage compartment of the bus 52 and put down in the region of the security zone 18, 118, as illustrated in step S6. Inside the security zone 18, 118, the locking mechanism of the security unit 14, 114 can be opened and removed from the object 56 by means of the mobile terminal 32, as illustrated in step S7. After the security unit 14, 114 has been opened and possibly removed, the mobile terminal 32, 132 can be decoupled from the security unit 14, 114, as illustrated in step S8. In a subsequent step S9, the security unit can be returned, for example, back to the holder or the charging station. The security unit 14 can thus be used again to secure a further object, for example, an object belonging to another passenger.

During the aforementioned steps S3 to S8 illustrated in FIG. 4, the security system 10, 100 is preferably designed to recognise, by means of the presence and/or content of the status enquiry signal, whether or not the at least one security unit 14, 114 is located inside the security zone 18, 118. If the security system recognises that the security unit 14, 114 is not located inside the security zone 18, 118, an alarm, for example, the alarm signal, can be emitted. Otherwise, the security system can determine again whether or not the security unit 14, 114 is located inside the security zone 18, 118. The alarm generating unit 24 can generate the alarm signal 26.

Coming back to step S2 in which the security unit 14, 114A is coupled to attributes that can be assigned to the object, a passenger, for example, of a bus, can additionally carry out a “self-check-in” via the security system 10, 100. In the case of a bus ride, a coupling can be successfully carried out, for example, using the coupling means and the coupling elements, between the security unit 14, 144 and an attribute that can be assigned to the object 56, and the passenger can thus check in for the previously booked bus ride automatically, i.e., without any further action, for example, by a bus driver. It is conceivable that the user software of the mobile terminal 32, 132 of the passenger links a ticket for a route with the bus or the security unit assigned to the bus and thus establishes that the passenger is present and will set out on the route, thus triggering and carrying out a “self-check-in” of the passenger automatically. If necessary, the passenger can personally initiate and/or confirm the “self-check-in” after the security unit has been coupled to an attribute that can be assigned to the object, such as the passenger and the associated travel ticket.

In the following, a locking mechanism will be described, which is known from patent application 10 2019 204 779.3 of the same applicant. The anti-theft device described therein has a locking mechanism having a mechanically and/or motor-actuated release element which is at least partially made of a thermally and/or magnetically activatable shape memory alloy. The release element can be actuated in order to open the locking mechanism by supplying energy from an internal battery, which is provided by the anti-theft device when a release signal is received, and possibly by supporting an opening movement of the release element with a prestressed spring. The release signal can be transmitted from a mobile terminal which is coupled to the anti-theft device via a wireless connection. In a retail application, the release signal can be transmitted, for example, after the mobile terminal of the customer has connected to the anti-theft device via a wireless network using application software and the customer has made a payment transaction.

The locking mechanism described above can also be used in the at least one security unit 14, 114 and the mechanically and/or motor-actuated release element can be actuated in response to an unlocking signal from, for example, the mobile terminal 32 and the locking mechanism can thus be unlocked.

The invention claimed is:

1. Security system, comprising:

a central unit;

at least one security unit which is connected via a wireless connection to the central unit and has a security unit receiving unit;

a predetermined security zone which extends around the central unit and in which the wireless connection between the central unit and the at least one security unit exists, the central unit comprising a central unit transmitting unit which is designed to transmit a status enquiry signal via the wireless connection to the at least one security unit, said security system being designed to recognise, by the presence or non-presence and/or content of the status enquiry signal, whether or not the at least one security unit is located inside the security zone; and an alarm generating unit which is designed to generate an alarm signal if it has been recognised that the at least one security unit is located outside the security zone, the central unit comprising a plurality of subunits, each of which comprising a transmitting unit which is designed to send the status enquiry signal via the wireless connection to the at least one security unit, and comprising a central unit receiving unit which is designed to receive a status information signal from the at least one security unit, said alarm generating unit being designed to generate the alarm signal if it has been recognised by all of the plurality of subunits by the non-presence and/or the content of the status information signal of the at least one security unit, that the at least one security unit is located outside the security zone, and wherein the at least one security unit is designed to be detachably attached to or in an object, the at least one security unit having a locking mechanism which is configured to be unlocked in response to an unlocking signal received by the security unit, wherein the locking mechanism comprises an electromechanical actuator which is configured to be actuated upon receiving the unlocking signal such that it unlocks the locking mechanism.

2. Security system according to claim 1, the at least one security unit further comprising a security unit transmitting unit which is designed to transmit the status information signal.

3. Security system according to claim 1, the security zone being defined by a range achievable by the wireless connection, within which signals can be transmitted, and said range being defined by a transmission power of the central unit transmitting unit or/and a detection rate of the central unit receiving unit being defined such that it is less than 40 m.

4. Security system according to claim 3, the range achievable by the wireless connection being adjustable.

5. Security system according to claim 1, the security system further comprising a mobile terminal which is connected to the central unit and/or the at least one security unit and comprises:

a receiving unit which is designed to receive the status information signal and/or the alarm signal and to emit an alarm message based thereon;

and a display device which is designed to display the alarm message and/or to indicate whether or not the at least one security unit is located inside the security zone.

6. Security system according to claim 5, the central unit and/or the at least one security unit being designed to repeatedly transmit a signal assigned to a security unit to the mobile terminal by the wireless connection or a further wireless connection.

7. Security system according to claim 5, the connection between the mobile terminal and the at least one security unit being a secured connection, said mobile terminal having a coupling means for coupling the at least one security unit to the mobile terminal, and the at least one security unit having a coupling element.

8. Security system according to claim 1, the at least one security unit being transferable into an activated state and a deactivated state, with the alarm generating unit not emitting the alarm signal in the deactivated state of the at least one security unit, even if the at least one security unit is not located inside the security zone, and the security unit transmitting unit being designed to emit at least one deactivation signal.

9. Security system according to claim 1, the wireless connection consisting of a Bluetooth connection, a WLAN connection, a cellular connection, and an infrared connection.

10. Security system according to claim 1, the security system comprising a plurality of security units, each of which having a personal identification, said central unit being designed to assign the status enquiry signal and/or the status information signal on the basis of the personal identification of each security unit to one of the security units from the plurality of security units.

11. Security system according to claim 10, the identification being realised by a MAC address assigned to each of the security units or a hard-coded and unchangeable default name assigned to each of the security units or an RFID chip present in each of the security units.

12. Security system according to claim 1, the subunits being connected to one another and the security system being designed to evaluate the status information signals received from the subunits according to their reception strength by trilateration, so that a position of the at least one security unit can be determined.

13. Security system according to claim 2, the central unit being formed from at least two subunits which are arranged spaced apart from one another and whose respective receiving units receive the status information signal from the at least one security unit and the central unit being designed to use previously known positions of the respective receiving units and a signal strength of the status information signal to determine a position of the at least one security unit by triangulation.

14. Method for emitting an alarm signal by a security unit of the security system according to claim 1 comprising the steps:

connecting the central unit to the at least one security unit by a wireless connection;

determining the security zone which extends around the central unit and in which the wireless connection between the central unit and the at least one security unit exists;

transmitting the status enquiry signal by the central unit by the central unit transmitting unit;

receiving the status enquiry signal of the central unit by the at least one security unit by the security unit receiving unit;

determining by all of the plurality of subunits of the central unit of the security system, by the presence or non-presence and/or content of the status enquiry signal, whether or not the at least one security unit is located inside the security zone; and generating an alarm signal by the alarm generating unit if it is determined that the at least one security unit is not located inside the security zone.

15. Bus comprising a security system according to claim 1.

16. Use of a security system according to claim 1 for securing an object on a bus.

* * * * *